US008903379B2

United States Patent
Ceccherini et al.

(10) Patent No.: US 8,903,379 B2
(45) Date of Patent: Dec. 2, 2014

(54) BROADBAND TELECOMMUNICATION SYSTEM BETWEEN ONE OR MORE CONTROL CENTERS AND ONE OR MORE MOBILE UNITS

(75) Inventors: Francesco Ceccherini, Sesto Fiorentino (IT); Antonio Toaiari, Florence (IT)

(73) Assignee: Thales Italia S.p.A., Sesto Fiorentino (Firenze) (IT)

( * ) Notice: Subject to any disclaimer, the term of this patent is extended or adjusted under 35 U.S.C. 154(b) by 603 days.

(21) Appl. No.: 13/058,633

(22) PCT Filed: Aug. 10, 2009

(86) PCT No.: PCT/IB2009/053510
§ 371 (c)(1),
(2), (4) Date: Mar. 15, 2011

(87) PCT Pub. No.: WO2010/018529
PCT Pub. Date: Feb. 18, 2010

(65) Prior Publication Data
US 2011/0267969 A1  Nov. 3, 2011

(30) Foreign Application Priority Data
Aug. 13, 2008  (IT) ............... FI2008A0155

(51) Int. Cl.
H04L 12/28  (2006.01)
H04Q 7/30  (2006.01)
H04W 36/00  (2009.01)
H04W 36/08  (2009.01)

(52) U.S. Cl.
CPC ...... H04W 36/0083 (2013.01); H04W 36/0088 (2013.01); H04W 36/08 (2013.01)
USPC .......... 455/432.1; 455/345; 455/436

(58) Field of Classification Search
CPC ...... H04L 12/28; H04Q 7/30; H04W 36/0083
See application file for complete search history.

(56) References Cited

U.S. PATENT DOCUMENTS

| 6,975,684 B1 * | 12/2005 | Dabak et al. ........... 375/260 |
| 2005/0068894 A1 * | 3/2005 | Yu et al. ............ 370/235 |
| 2006/0114826 A1 * | 6/2006 | Brommer ............ 370/230 |
| 2010/0003983 A1 * | 1/2010 | Gallagher et al. ....... 455/436 |

FOREIGN PATENT DOCUMENTS

| EP | 1 601 136 A | 11/2005 |
| EP | 1601136 A1 * | 11/2005 |

OTHER PUBLICATIONS

Kumazawa M., et al. "Router selection for moving networks", Consumer Communications and Networking Conference, 2004, CCNC 2004, First IEEE Las Vegas, NV USA Jan. 5-8, 2004 Piscataway, NJ, USa IEEE, Jan. 5, 2004, pp. 99-104, XP01069807, ISBN: 9780780381452.*

(Continued)

Primary Examiner — Asad Nawaz
Assistant Examiner — Jason Harley
(74) Attorney, Agent, or Firm — Lucas & Mercanti, LLP (57) ABSTRACT

A broadband telecommunication system between one or more control centers (CC) and one or more mobile units (MU) moving at high speed, the communication being supported by a wireless radiosystem with handover (HO) roaming. According to the main aspect of the invention, it is possible to minimize the scan step of the handover, thanks to the introduction in the procedure of a certain number of parameters and the setting thereof suitably handled via a specific algorithm.

13 Claims, 8 Drawing Sheets

(56) References Cited

OTHER PUBLICATIONS

Kumazawa M., et al. "Router selection for moving networks", Consumer Communications and Networking Conference, 2004, CCNC 2004, First IEEE Las Vegas, NV USA Jan. 5-8, 2004 Piscataway, NJ, USA IEEE, % Jan. 2004 (Jan. 5, 2004), pp. 99-104, XP01069807, ISBN: 9780780381452.*

Kumazawa, M., et al.: "Router selection for moving networks", Consumer Communications and Networking Conference, 2004, CCNC 2004, First IEEE Las Vegas, NV, USA Jan. 5-8, 2004, Piscataway, NJ, USA, IEEE, Jan. 5, 2004, pp. 99-104, XP010696807, ISBN: 9780780381452.

Eun Kyoung, P., et al.: "Seamless mobility support for mobile networks on vehicles across heterogeneous wireless access networks", VTC 2003—Spring, The 57th, IEEE Semiannual Vehicular Technology Conference, Proceedings, Jeju, Korea, Apr. 22-25, 2003; [IEEE Vehicular Technolgy Conference], New York, NY : IEEE, US, vol. 4, Apr. 22, 2003, pp. 2437-2441, XP010862318 ISBN: 9780780377578.

Liang, X., et al.: "Mobile internet access for high-speed trains via heterogeneous networks", Personal, Indoor and Mobile Radio Communications, 2003, PIMRC 2003, 14th IEEE Proceedings on Sep. 7-10, 2003, Piscataway, NJ, USA, IEEE, vol. 1, Sep. 7, 2003, pp. 177-181, XP010681580 ISBN: 9780780378223.

\* cited by examiner

| IEEE Standard | Mod. Tech. | Freq. Band (GHz) | Max Rate (Mbit/s) |
|---|---|---|---|
| 802.11 | FHSS, DSSS | 2.4 | 3 |
| 802.11b | DSSS | 2.4 | 11 |
| 802.11g | DSSS, OFDM | 2.4 | 54 |
| 802.11a | OFDM | 5 | 54 |

Fig. 7

|  | FHSS | DSSS | OFDM |
|---|---|---|---|
| Max Data Rate (Mbit/s) | 3 | 11 | 54 |
| Max Net Throughput (Mbit/s) | 2 | 6 | 24 |
| Narrow Band Interference | Very Good | Good | Very Good |
| Delay Spread (Multi-path Fading) | Good | Good | Very Good |
| Intentional Attack | Very Good | Poor | Very Good |

BROADBAND TELECOMMUNICATION SYSTEM BETWEEN ONE OR MORE CONTROL CENTERS AND ONE OR MORE MOBILE UNITS

This application is a U.S. national stage of PCT/IB2009/053510 filed Aug. 10, 2009 which claims priority to and the benefit of Italian Application No. FI2008A000155 filed on Aug. 13, 2008, the contents of which are incorporated herein by reference.

FIELD OF THE INVENTION

The present invention refers to a broadband telecommunication system between one or more control centers (CC) and one or more mobile units (MU) moving at high speed.

BACKGROUND OF THE INVENTION

The communication between the high speed moving element, typically transportation media for people and/or goods, is supported by a wireless radio system provided with roaming Hand Over (HO) between the network (on-board system) installed on the mobile unit and the network of the ground system.

In the present context, as transportation media it is intended for instance car, trucks, trains for metropolitan or long distance railway lines, tramway cars, trolley buses, ships/boats/rafts, trolley for waste transportation devices etc. The goods can be raw materials, finished or semi-finished products, by-products, wastes etc.

The radio systems actually known to support communications, in all the environments where the speed of the moving media is a characterizing element, like Universal Mobile Telecommunication System (UMTS), Global System for Mobile communications (GSM) or Terrestrial Tracked Radio (TETRA) are limited in terms of bandwidth and supported services and can't be efficiently used when the broadness of the bandwidth characterizing the services to be delivered is an essential requirement.

The above mentioned limitations, in terms of efficiency and grant of the "live" and "real time" attributes to the provided services, are limiting the use of the WLAN (Wireless Local Area Network) technologies defined in the standards IEEE 802.11 FHSS, IEEE 802.11 a,b,g and 802.16, in all cases where the speed of the moving media is the characterizing element. In fact, it is clear that, unlike a home or office environment, where roaming is rare and deferred communication is tolerated, radio communication-based control demands for continuous and efficient communication, complying with the requirements set by the type of services (live, data transmission etc.) to be provided, in an environment where roaming is a certainty and often occurs at very high speeds.

In these circumstances, it would be desirable not only to ensure the connection between the ground control center and the moving vehicle, as in the known systems, but also ensure and maintain the broadband communication channels (tents of Mbit/sec per channel) that allow for simultaneous services such as simultaneous high quality video (25 fps and network latency less than 30 msec) streaming from several cameras with no significant image slowing or freezing phenomena, real time high speed data transmission, real time video broadcasting (news, advertising), real time voice communication.

In greater detail, according to the known art, a network established to provide communications between the subsystems installed on the mobile units and one or more control centers is indicated as Communication System (CS). The CS is an integrated seamless Ethernet-IP network that includes both wire-line and wireless components. The CS is thus a mix of network wire equipment and radiofrequency wireless components, all protected by a safe security system, and is based on commercial off-the-shelf components and open standard software and protocols interconnected and functionally integrated according to architectures and software properly developed as a function of the required applications.

The CS is in practice a combination of hub/switch apparatus, provided with suitable access interfaces (Ethernet or else) and radio, interconnected by optical fiber wire network, copper wires and radio connections. The Ethernet hubs/switches are installed inside equipment rooms and have a dual purpose; to aggregate the interconnection of the Access Point (AP) radio units, and also to form a high-speed Ethernet backbone. The interconnection of the AP to the network switches is achieved via multi/mono mode fiber-optic cabling and electro-optic converters, copper cables and radio connections to establish ground connectivity and/or radio connection. The high-speed Ethernet backbone is achieved by interconnecting the Ethernet/IP switches together via single-mode fiber-optic cabling and/or radio connection.

The AP are typically placed at fixed locations and act as the access interface between the wireless coverage area and the network hubs/switches. The access points for these applications are normally installed in harsh weather conditions and are housed in enclosures which meet the standard established for each specific environment (thermal, vibrations, wind, strength etc).

The on-board network is installed on the mobile media (car, plain, metro train, railway train etc). Depending on the size of the mobile media, the architecture of the mobile network may vary significantly with the target of obtaining the best efficiency out of the wi-fi radio technology used.

The AP locations must provide uniform signal strength over the area of interest. The distribution of APs along the MU path is based on the MU's roaming and joining thresholds, which is based on the determination of the interference/noise floor.

The APs must provide full area coverage with a consistent minimum signal level above the measured noise floor, measured in accordance with the coverage targets and the minimum signal/noise ratios established in order to attain the prefixed design objects (min. and max. established bandwidth, min. and max. throughput etc.)

Figure 1:
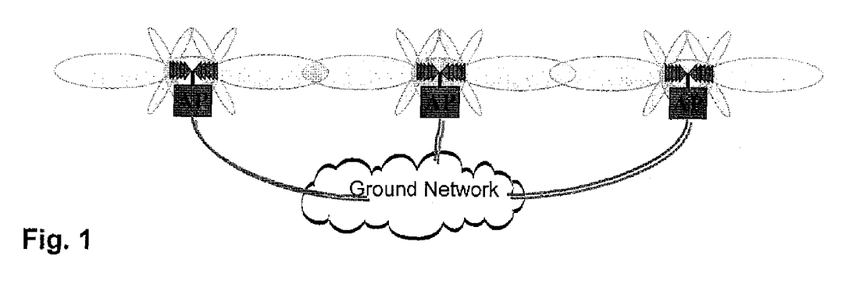
FIGS. 1 and 2 are respective schematical representations of broadband telecommunication systems according to the prior art relevant to the present invention.

Once the noise floor has been established it is possible to determine the minimum signal coverage required to assure the system throughput. This is an input to determine the AP positioning (see FIG. 1).

Figure 2:
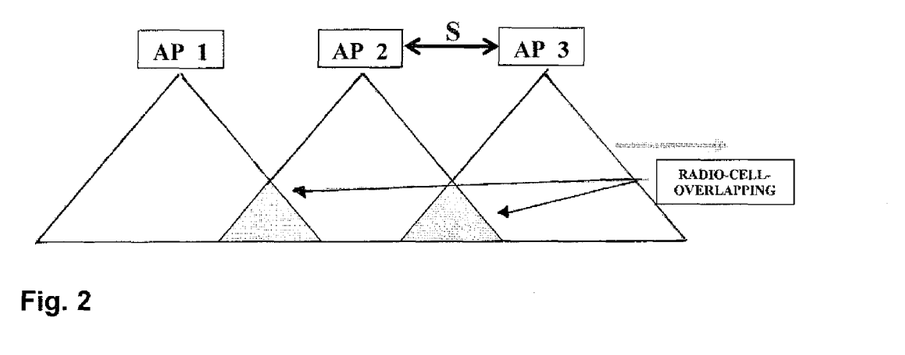

One of the main optimization target, in order to reduce the number of AP's assuring the coverage in the given area is to reduce the radio cells overlapping. among adjacent APs (see FIG. 2).

To this end, it is desired to reduce the pre-handover time (scan and search of a new AP with a better signal) and handover time (disconnection from the AP to which the MU was connected and reconnection to the adjacent AP having a better signal, previously detected by the MU).

The concept of wireless roaming involves therefore a series of MU-to-AP association and connection, disconnection, and re-connection. During the roaming process only the MU is responsible for initiating an association with the AP.

A disconnection between MU and AP occurs when an existing connection disconnects due to the signal level received decreasing below an established threshold, as per the above described criteria. A disconnection may be initiated by either the MU and/or the AP. Re-association occurs when the MU re-associates either with a new AP or a previously associated AP.

At any given instant, a MU may be associated with no more than one AP, this ensuring that the MU maintains only one connection to the network. On the other hand, an AP may have many MUs associated with it at any given time.

The 802.11 specification provides functionality for roaming from one AP coverage area to another AP coverage area. The conventional roaming logic implemented in 802.11 devices is based on an election process, where the precondition for association to the next best AP is based on the MU moving towards a stronger signal while the existing signal is reducing in strength.

The handover procedure can be divided, as mentioned, into two logical steps: discovery and re-authentication, where the device performing the handover is the wi-fi card installed on the CU (Control Unit) on-board the MU.

The discovery (or scan) can be expressed in the following terms. As a result of (e.g.) the train moving along the tracks, the signal strength and signal-to-noise ratio of the link degrades. A handover algorithm, implemented in the wi-fi radio card (RC) installed on the mobile unit starts looking for the new AP performing at the MAC (Media Access Control) layer the active scanning of the selected frequency range.

Then, as far as the re-authentication is concerned, when the wi-fi card finds a new AP the signal of which exceeds a predefined value, a connection to the new AP is allowed.

Figure 3:
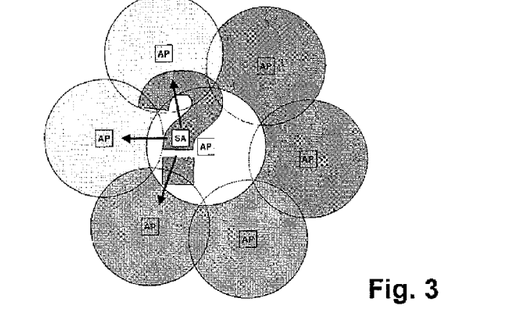
FIG. 3 is a scheme that generally represents the concept of roaming.

According to the known art, while in the roaming mode, the mobile MU will select the next best AP from a list of neighboring APs where at least one of these APs will have a signal level above the MU's joining threshold. This roaming logic ensures handovers via networks based on omni-directional cells where the MU may move in any direction and where there is more than one AP to roam to (FIG. 3).

The conventional roaming logic implemented in the 802.11 standard does not provide any guarantee on the time the MU takes to roam to the neighbor cell. The probe delay (scan step) accounts for the biggest part of the overall handover time.

Figure 4:
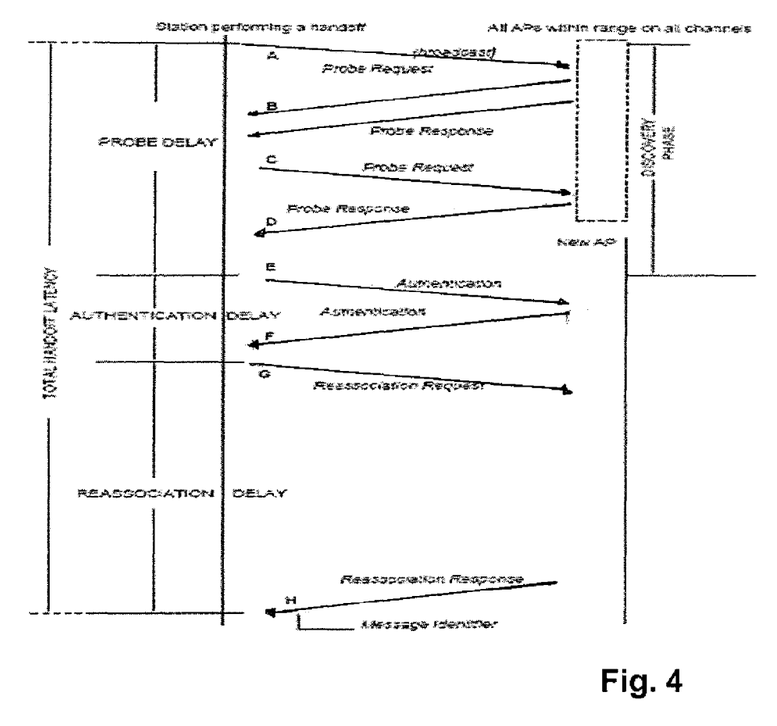
FIGS. 4 and FIG. 5 are respectively a schematical elucidation and a signal/time diagram of a known handover procedure.
Figure 5:
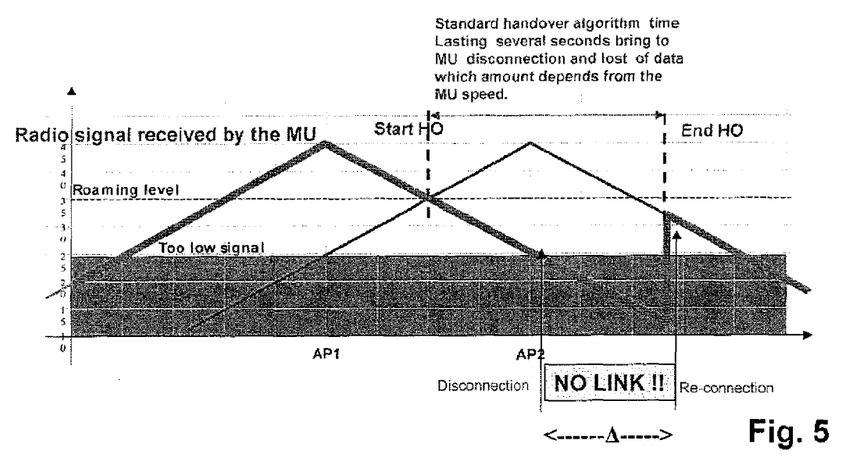

This is one of the main limitation to support the above mentioned real time services especially when the MU is running at high speed. Depending on the speed of the MU the connection can be lost for several seconds (see the self-explanatory diagrams of FIGS. 4 and 5), causing a degradation that in many circumstances can become completely unacceptable with respect to the services that need be guaranteed. In the diagram in FIG. 5 it can be noted in particular the time delay HO which represents the handover duration, and the time range Δ in which, as a result of said delay, there is disconnection and data loss, all the more so when the speed of the vehicle is high.

The lack of control in the handover time is particularly detrimental and critical when, in order to maintain the original characteristics, and this the quality of the transmitted signal, it is necessary to ensure constant and pre-established time intervals between the reception of two successive packets of said signal. Such time interval depends on the type of service, e.g. for the VOIP services it must be less than 100 msec, while for video streaming at 25 fps (frames per second) it must be less than 40 msec. Since said intervals are inclusive of the time the data take to go through the network between the MU and the CC, as a consequence the handover time need be much shorter than 40 msec.

SUMMARY OF THE INVENTION

The object of the present invention is therefore to overcome the drawbacks and limitations of the known systems by providing a more efficient broadband telecommunication system between one or more control systems and one or more mobile units ensuring, among other things, the execution of the handover procedure in times that ensure the maintenance of the original (native) characteristics of the services to be transmitted and make the handover seamless, that is to say not influencing the data packet transmission intervals and the network pass times, without connection losses, in a manner which is adaptable as a function of the specific applications and circumstances of use.

This and other objects are achieved with the telecommunication system according to the present invention, the essential features of which are defined by the first (independent) of the attached claims.

Other advantageous features of the invention are defined by the dependent claims.

BRIEF DESCRIPTION OF THE DRAWINGS

The characteristics and advantages of the broadband telecommunication system between one or more control systems and one or more mobile units according to the invention shall be apparent from the following description of an embodiment thereof, provided for exemplifying and non-limiting purposes with reference to the attached drawings, wherein.

Figures from 6 to 8 are diagrams and tables indicating the characteristics of the IEEE 802.11 standard.

Figures from 15a to 15e depict at a macroscopic level the various steps of the handover procedure according to the invention.

DESCRIPTION OF THE PREFERRED EMBODIMENTS

Referring to the above figures, a system according to the invention, as far as all that is not specified hereafter is concerned, is compliant with the general characteristics of the above mentioned known systems.

Figure 6:
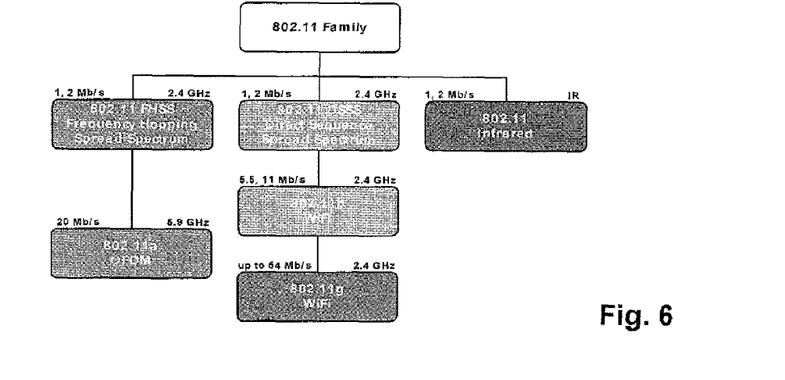
Figure 7:
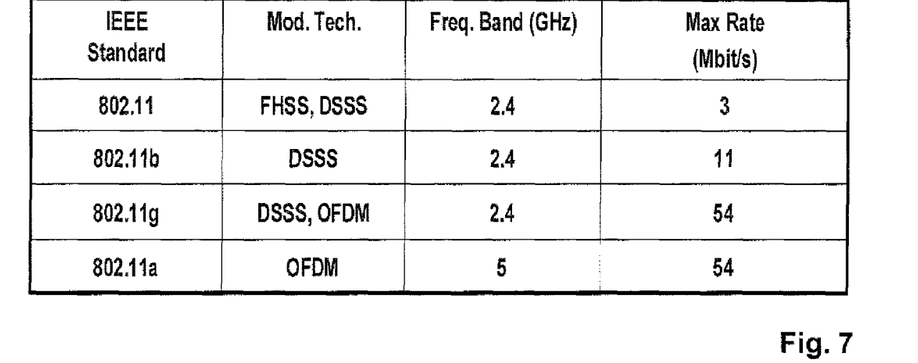
Figure 8:
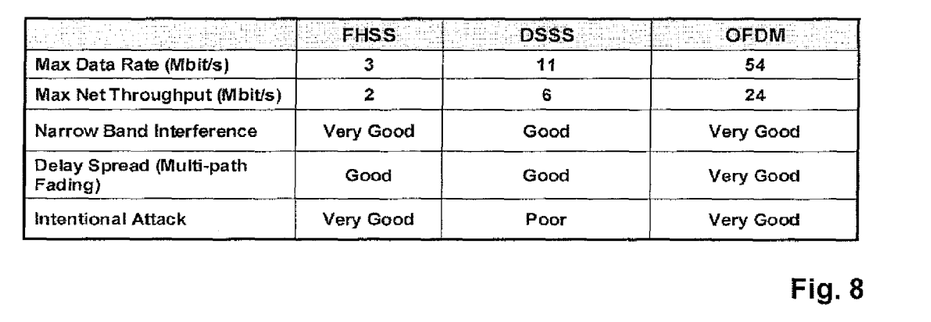

The reference transmission standard which supports the system is that established by the IEEE 802.11 family, well known to any person skilled in the art. The standard is specified in the diagram of FIG. 6 and has the main features and performances (in terms of bandwidth, modulation techniques, robustness to interferences) summarized respectively by the self-explanatory tables of FIGS. 7 and 8.

In addition to the standard indicated in the above cited diagrams and tables, the system is adapted to support also the standard 802.11n, working at 540 Mbit/s, for which a final certification by the IEEE is presently expected. However, the performances of the system will be assured not only using the frequency bands contemplated by the above mentioned standards, but in any other radio frequency band of the transmissive channel compatible with the frequency required by the services to be broadcasted.

The frequency planning divides the 2.4 GHz spectrum into fourteen overlapping channels whose center frequencies are 5 MHz mutually spaced apart. All channels can be simultaneously operated, but only three non-overlapping channels can be used to make available the 22 MHz maximum bandwidth of the standard, allowing for the maximum performances. Therefore, in order to have the highest system performances, it is necessary that the frequency allocation along the path of the moving unit allows for the maximum bandwidth availability.

Figure 9:
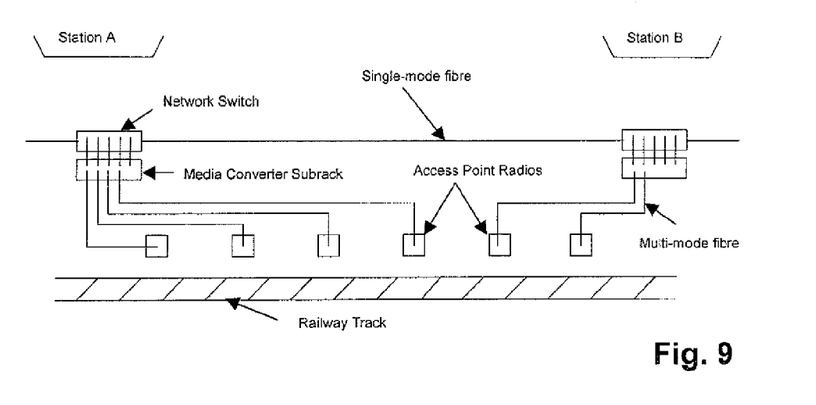
FIGS. 9 and 10 are schemes representing a network architecture according to an embodiment of the invention.
Figure 10:
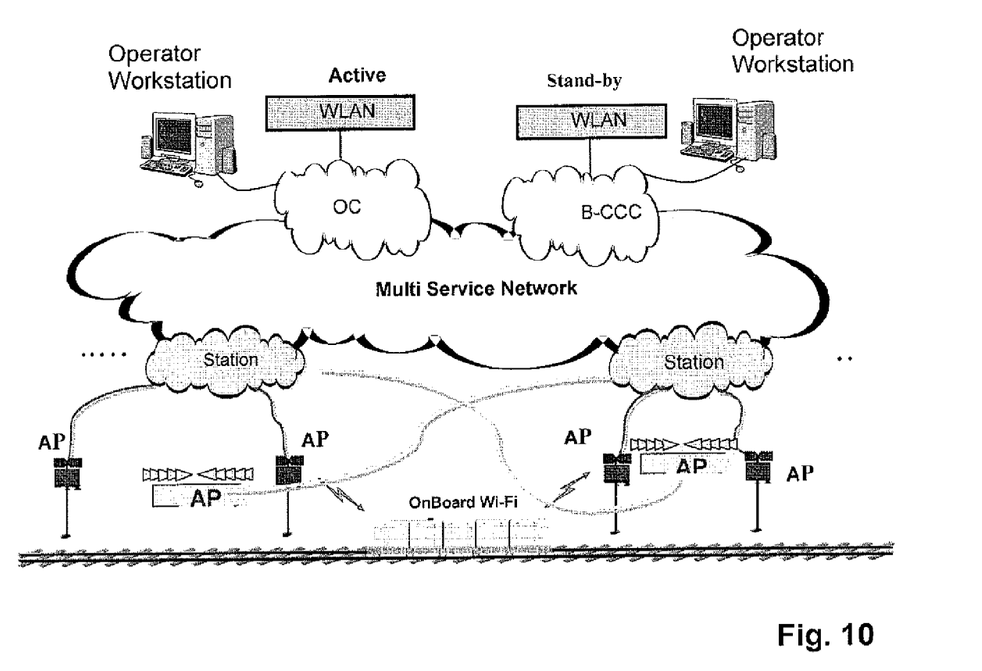

The network architecture adopted is typically a communication system with interconnections based on cables in copper/optical fiber and/or radio connections, e.g. in an environment of railway/metro train according to the representations in FIGS. 9 and 10. On the other hand, the invention can be exploited with other types of networks such as mesh-type networks and customized networks. Mission critical applications requiring very high system reliability, disaster resilience and system recovery without interruption of the given services, are preferably supported by a properly designed network architecture according to the scheme in FIG. 10. In practice, the radio access points along the line are alternatively connected to adjacent stations in such a way that a fault or accident in a station doesn't affect the service that is assured by the neighboring station.

Moreover, the possible degradation of the performances caused by the increased distance of the APs along the line, due to the failure of the APs connected to the out-of-service station, is made less critical by the fact that, according to one aspect of the present invention (as made clearer hereafter) it is possible to exploit and indeed take advantage of the length of the vehicle with a multiplicity of control units distributed along the same (for instance one at the front and one at the rear of the train), so that said length may contribute to counter to the temporary increase of the distance between the APs.

Active and stand-by control centers are also provided, in order to ensure full functionality in case of fault or accident in one of them, the function of disaster recovery being achieved thanks to the physical separation between the CC, the station apparatus and the APs.

The handover is handled via an algorithm carried out via a software which controls the wi-fi radio device installed in the CU. Said software can also be referred to as WLAN driver, or simply WLAN.

Turning to the main aspects of the system according to the invention, it was previously mentioned that the handover procedure can be divided in the two logical steps of scan an re-authentication, and that it is the scan step (or, more properly, its delay) to have the greatest responsibility in determining the overall length of the handover in the known systems. On the contrary, the invention permits to minimize the scan step by means of the introduction, in the procedure, of the control and setting of a certain number of parameters, suitably handled according to a specific algorithm which does not base its decision-making process simply on a criterion "Roam Low" and "Join High", but on the use of certain parameters the evaluation of which determines the subsequent behavior of the system.

In fact, in the algorithm according to the invention a plurality of parameters are controlled, among which:

list of the channels that have to be scanned when a roaming event is started; the operation is made much faster by the fact that only the frequencies provided for along the path of the MU preliminarily detected according to the above mentioned criterion that only three non overlapping channels make the maximum bandwidth of 22 Hz available. The channels selected so that the maximum transmissive bandwidth is assured are stored in the handover algorithm. In this way, it is preliminarily known the succession of radio channels along the movement direction of the MU. Being it known the channel on which the transmission presently occurs, it will be also known which will be the successive channel to which the MU is to be joined. Therefore, the scab time for detecting the new transmissive channel is dramatically reduced.

time during which the APs (radio channels associated thereto) detected at a given instant, are deemed still "valid" by the application. When this time has lapsed, a new scan is started, the list of the valid APs is updated, and these are used till the successive scan. This allows for a reduction of the number of scans (that will also depend on the speed of the vehicle), and also for the possibility of having a constantly updated list, at a given time, of the channels that can be seen by the MU.

measurements of the received signal/noise ratio received for each channel.

threshold under which the prefixed bandwidth cannot be obtained with the transmitting channel, and it is necessary to trigger a roaming event. Thanks to this parameter, the system has a remarkable flexibility of use in respect of the services to be transmitted. In fact, a roaming event is not simply generated by an evaluation of the signal/noise ratio, but by the evaluation of the signal/noise ratio necessary for maintaining the band performances required, so as the quality of the service can be effectively handled and programmed, contrary to the "best effort" criterion of the known system. This parameter can be handled in adaptive mode, according to which the system reduces the transmitted band as a function of the signal/noise ratio available, or prefixed in such a way that a minimum established band is ensured.

threshold under which the level of the received signal (Received Signal Strength Indication-RSSI) by the client triggers a roaming event;

hysteresis threshold, that is the value which has to be exceeded by the difference between the signal RSSI received by an AP with respect to the AP to which the MU is presently connected, in order to trigger an event of re-authentication on the new AP. This parameter has the function of ensuring that a handover event is triggered only with APs (radio channels) at a sufficient level, so that the connection can be maintained for a prefixed time, which is a function also of the speed of the MU, and limit the possibility that a handover event is triggered on signals reflected by distant APs, overlapping for short lengths the signals of the successive APs. A lack of control in connection with these aspect could trigger a succession of handovers at very close time range, and a consequent decay in the performances of the system.

time lapsing between the scan of a channel and of a subsequent one;

time lapsing between a comparison of the decision thresholds (transmission rate and RSSI) and the subsequent one.

Figure 11:
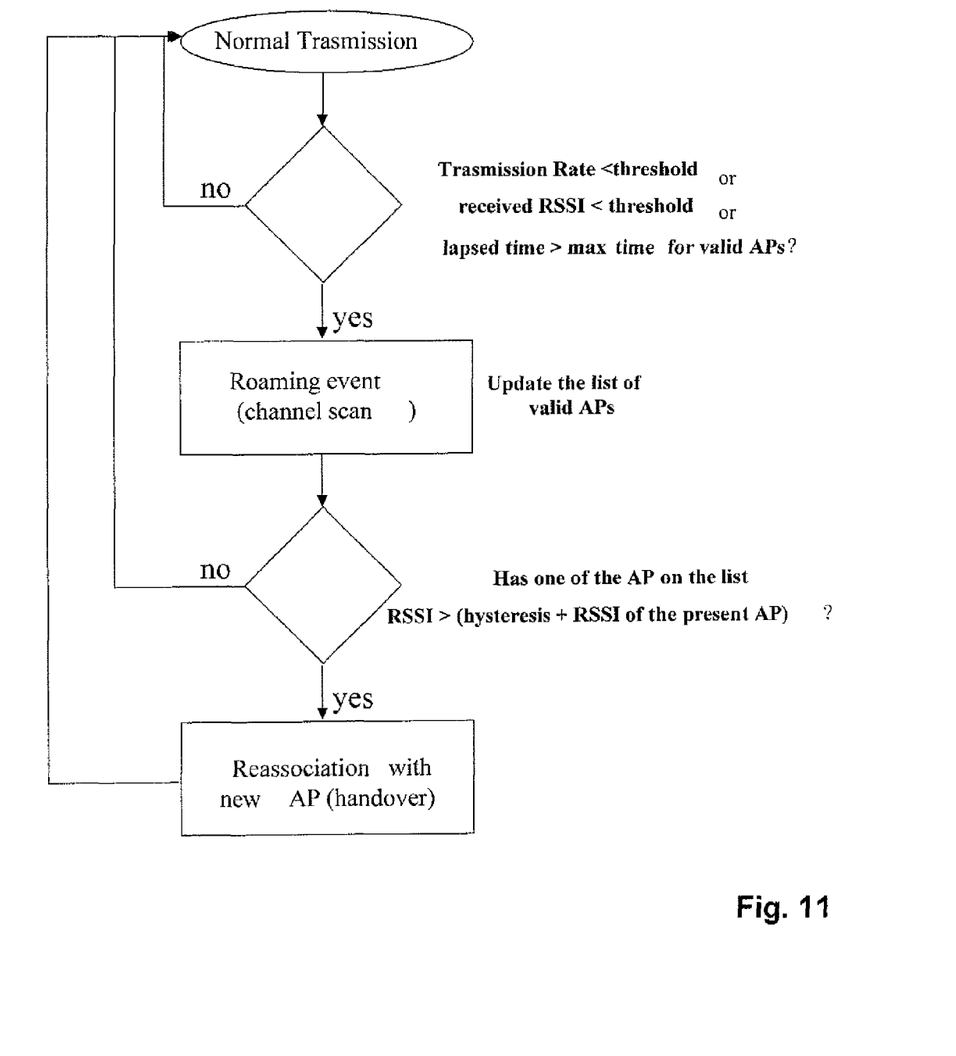
FIG. 11 is a simplified flowchart of a handover procedure according to the invention.
Figure 12:
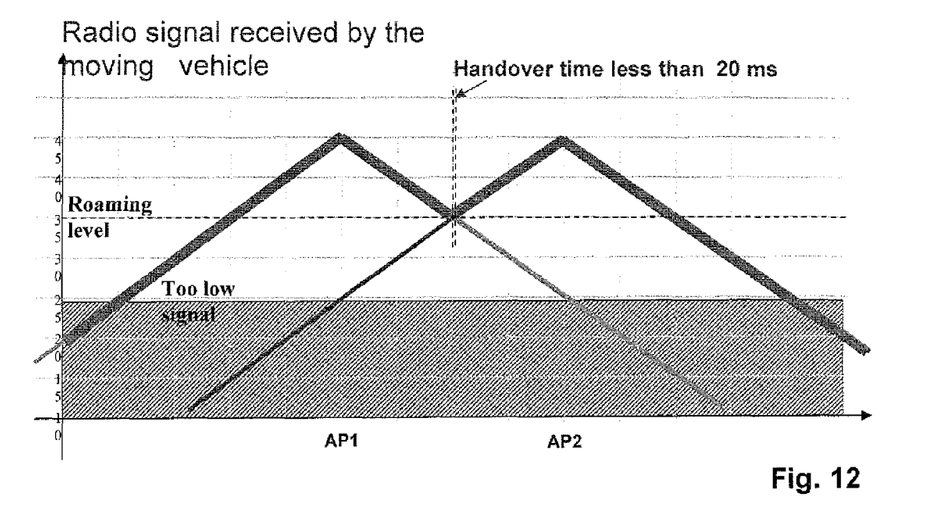
FIG. 12 is a signal/time diagram of a handover procedure according to the invention.

A handover procedure according to the invention can in practice be exemplified by the self-explanatory flowchart of FIG. 11. All the cited parameters are programmable and permit a system adaptation to any working conditions (speed of the MU, topography of the route and of the tunnels, position of the antennas on the vehicle etc.). This approach permits to minimize the scan step (probe request-response phase), by specifically setting the parameter for each particular application. As a consequence (FIG. 12), seamless handover is performed (HO time<20 msec) between adjacent APs along the direction of the moving vehicle (MU). This allows for keeping the HO time well under the maximum transmission range of the data packets of those services—nowadays mainly voice and video transmissions—for which said maximum range must be ensured not to have a decay of the quality of the data received on the ground. This handover time is in fact sufficiently short to a consistent further tolerance for the network latency time with respect to the minimum required latency.

Figure 14:
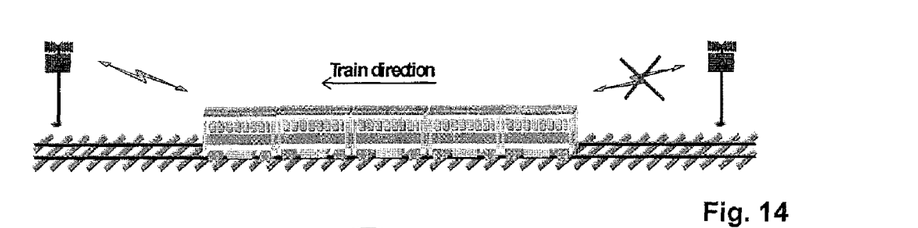
FIG. 14 sketches at a macroscopic level a handover step according to the invention.

In complex network systems, the process can be implemented with the coordination of a centralized controller that is part of the ground network. The centralized controller knows the position of the MUs and CUs along the line. During the handover process, it manages the re-association of the MU from old AP to the new one and reroutes the data being sent (train-to-ground and ground-to-train), from one AP to the next according to the MU reconnection (FIG. 14).

This process is carried out along the whole path and for all MUs connected to the network. The centralized system controller is able to instantly manage the handover of all the MUs in the network ensuring the parameters necessary to satisfy the quality requirements (data flow, quality requirements for all the transmissions which are to be carried out real time etc.) of all the ongoing transmissions.

Moreover, for realizing the optimal performances in terms of bandwidth available over the whole network, in line with the object of the present invention, it is preferable that all the APs are linked with the CC in a star architecture, that is to say without any APs of the network having also functions of aggregation, interface and network link to other APs. This, given the fact that the interconnection band is to be shared, would unavoidably limit the band available to each AP, as in particular in the case of interconnections towards aggregation APs carried out via radio links.

As a function of the length of the MU it is possible and preferable to take advantage of the length by introducing additional CUs, to be installed even at the ends of the vehicle, and thus adopting the handover control and operation as described further on. This makes possible to increase the distance among the ground APs proportionally to the length of the MU, and to use at any given moment, for transmitting the data to the ground, the CU that receives the signal with best quality parameter, among those available in the area instantly occupied by the MU, even inside the coverage area of a same AP. This is made possible by the provision of a further handover procedure that is carried out among the CUs of a same MU, integrated with the previously described handover among different APs.

In case of a handover among units of the same MU, within the coverage area of a same AP, it is not required an intervention of the CC for rerouting the data being transmitted to and from the MU, and therefore said on-board handover is made even faster as explained hereafter. This procedure is advantageous because the increased number of handover processes that in this way occur, and their quick succession also in respect with the speed of the MU, may in itself cause, under certain circumstances, congestions in the network and delays in the handover time.

Thus, in case the length of the mobile unit requires the use of additional CUs, the handover is implemented with an appropriate application (Handover Coordination Application-HCA), installed on-board the MU (train, bus, car, truck, ship etc.) and executed in a coordinated manner with the ground system.

Figure 13:
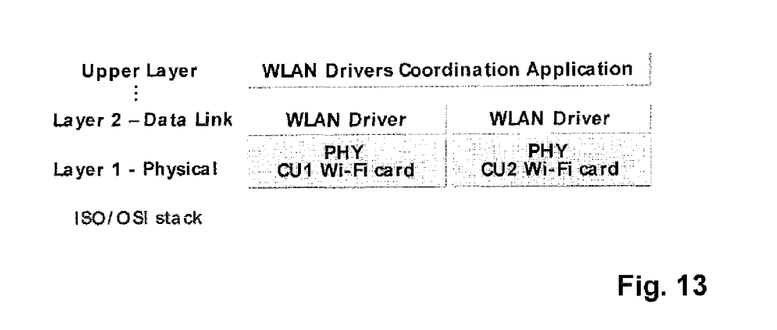
FIG. 13 is a diagram representing a system architecture according to the invention, in accordance with the ISO-OSI model.

According to the ISO-OSI reference model, the physical level provides for the hardware means for sending and receiving the data on a radio carrier. The Data Link Layer is divided into two sub-layers: the Media Access Control (MAC) layer and the Logical Link Control (LLC) layer. The MAC sub-layer controls the access of the MU to the network and authorizes to start the data transmission, while the LLC sub-layer controls frame synchronization, flow control and error checking. FIG. 13 sketches the solution designed according to the invention, in case of two control units, in accordance with the ISO-OSI model.

In a further aspect of the invention, the on-board receiving-transmitting means attain a solution adapted to optimize the radio connection towards the ground network, with respect to the position of the access points APs. To this purpose, in fact, rather than a single CU working with a multiplicity of antenna systems (a solution in any case encompassed by the scope of the invention), a plurality of CUs are preferably installed on the MU, depending on the length of the same, so that an optimal radio connection is afforded, according to the definitions given above. The MU is radio connected to the APs of the ground network, by means of a system of on-board antennas (each CU has its own antenna system), in such a way that only a single CU is connected at a time. Selection/switch means are provided, comprising a switch working on the on-board LAN, connecting the various CUs and switching the on-board data flows.

The HCA is executed to guarantee the optimal management of all the on-board CUs. It controls the physical level (see above the reference to the ISO-OSI model) and the level of the signal received by the wi-fi radio units of each MU, and decides which CU and antenna system must be used by the MU to communicate with the ground network.

According to a particular and advantageous characteristic of the invention, through the HCA running on the on-board CUs, the same MAC address is assigned to all the mobile wi-fi radio units of the MU. In this way, complex and time consuming interventions of the ground system controller (that works at the second layer of the ISO-OSI) are avoided when the handover is executed between the CUs of the same MU in the coverage area of a same AP, avoiding a rerouting of the data between different APs. Thanks to this, the ground system controller "sees" all the wi-fi radio units installed on the MU as if they were a single one.

Figures 15A, 15E:
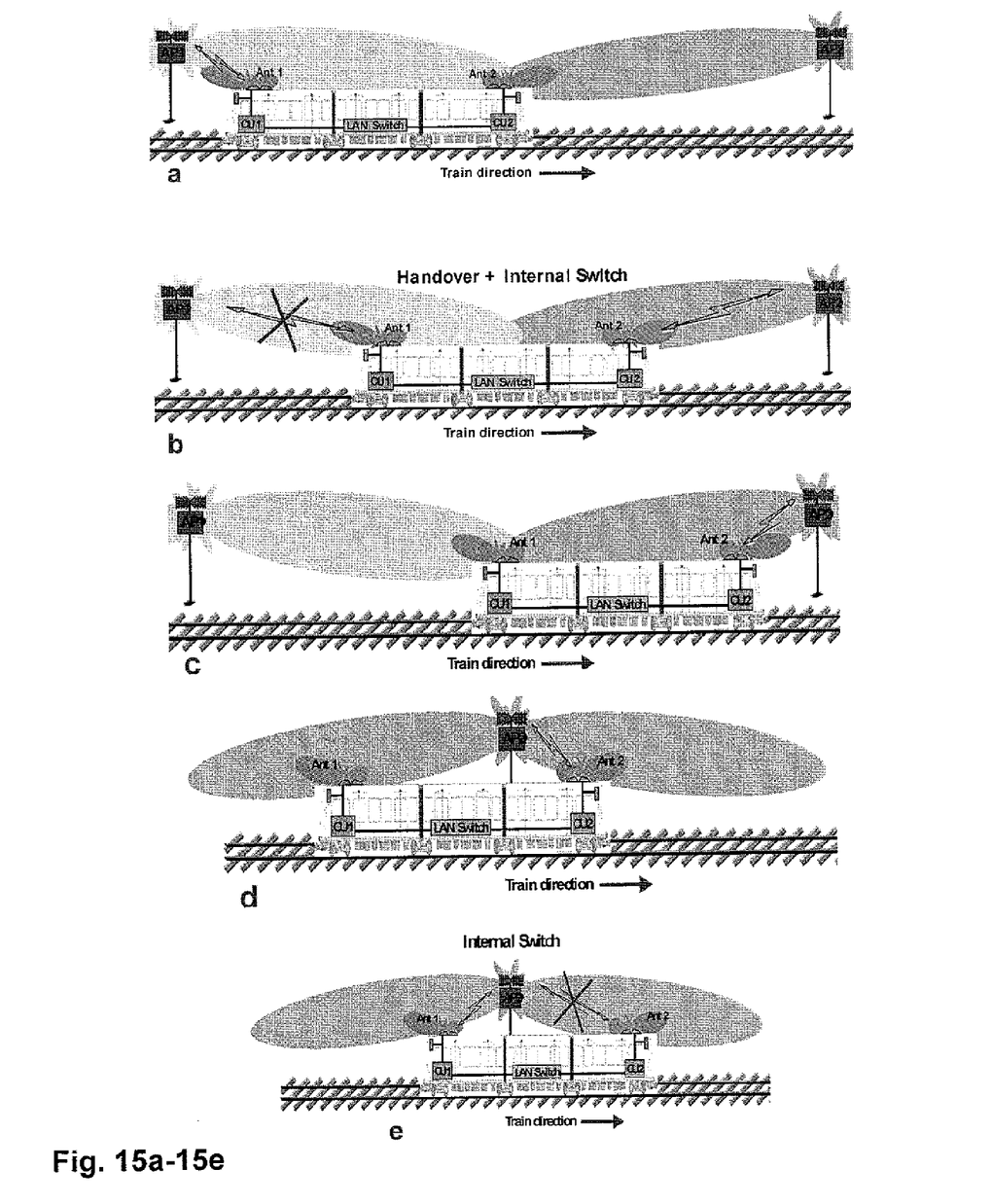

The representations of the figures from 15a to 15e depict the execution of the handover in relation with the coordination functions between the on-board CUs, controlled by the HCA via the on-board LAN switch. In FIG. 15a, the wi-fi radio unit installed in a first CU (CU1) is responsible for the radio link and, as a consequence, its antenna (Ant1) is connected to an AP indicated at AP1. The HCA is continuously monitoring the status of the wi-fi radio units installed on the on-board CUs and, analyzing the carriers of the radiofrequency signals provided for in the frequency plan assigned to the MU, measures the critical parameters and estimates the quality of the parameters attainable in case a link is established. Said parameters are compared with the ones detected for the other on-board CU (CU2) in order to decide which wi-fi radio unit is to be kept in scanning mode and which one to be kept activated for the connection to the ground APs.

In FIG. 15b, the MU is running between two AP positions (AP1 and AP2). When the HCA finds a better signal carrier on CU2 than CU1 the internal switch between the control units is driven, assigning the transmission of the signal to the wi-fi radio unit of CU2, and the handover between the two adjacent AP1 and Ap2 positions is triggered. These two operations are executed simultaneously.

After that (FIG. 15c), CU2 becomes responsible for the radio link and via its antenna (Ant2) is kept connected to AP2. In the step of FIG. 15d, there is still a connection between Ant2 and AP2 through the secondary lobes of radiation of the antenna system of AP2. Finally (FIG. 15e) the HCA detects a better signal on CU1 than CU2 and assigns the signal transmission again to CU1, solely by means of the switch on the on-board system.

In practice, the HCA running on the on-board CUs, by assigning the same MAC address to all the wi-fi radio units of the MU, does not permit the detection of the fact that the transmitting radio unit has been changed, and the radio link is kept between the same AP2 and the secondary radiation lobe of the antenna system Ant1 of CU1. This avoids the execution of the procedure provided for by the standard for ensuring the connection and the correct association of the data received when the MAC variation is detected.

The above described sequence is periodically repeated as the MU moved along its route.

Figure 16:
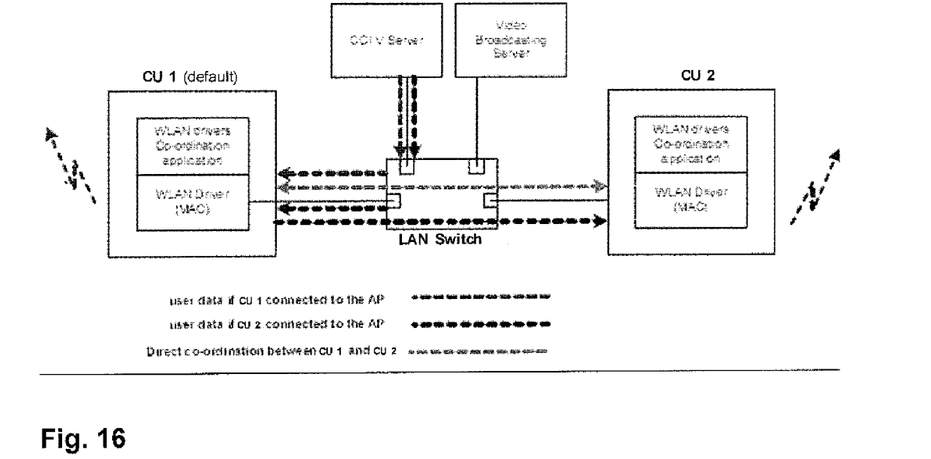
FIG. 16 is a block diagram showing the interactions between two control units arranged according to the invention in a same mobile unit.

As far as the interactions between the control units are concerned, with reference to exemplifying diagram of FIG. 16, it is to be noted namely that CU1, CU2 and a server CCTV are linked with the same LAN and connected by one or more switches of the LAN network.

The data exchange is then made possible between all the devices belonging to this local network. One CU of the board network (CU1 in this example) receives the function of master of the network, and acts therefore as a default user data destination. The system architecture can be thus defined a master-slave architecture, which CU acting as a default user data destination being defined by a static (but modifiable) configuration parameter.

As already mentioned, each of the applications residing on the CUs (as part of the HCA) monitors the status of its own wi-fi radio system, link quality and scanning results, and then communicates, via the HCA, with the application on the other CU. The HCA, generally residing in the master CU (CU1), decides which wi-fi radio unit should be in scanning mode and which instead should be activated for the connection with the ground network. This communication occurs via the interfaces of the switches of the on-board LAN.

Additionally the HCA will supervise the functionality of the hardware components and, in case of failures, automatically redirects the user data via the remaining operational CUs.

User data (e.g. CCTV video streams) are always routed to the default master CU (CU1 in this example). If, at a certain time, this default CU has the connection with the ground AP, it will send out data directly via its own wi-fi radio unit and antenna system. Otherwise, if the other CU (e.g. CU2) at the moment is responsible for the train-ground radio link, the master CU will route the data to the other CU which is connected to the AP.

In case of failure of one CU a procedure will be entered which allows for maintaining the transmission of the data flow, possibly in degraded mode. If necessary, the data to be transmitted are routed to the CU which offers the best quality parameters at the given moment, possibly adapting the data flow transmission speed to the available bandwidth as a function of the quality parameters measured on the signal received by the same CU.

The wi-fi radio unit (referred to also as "WLAN drive" or simply WLAN, meaning with this the control software installed in the unit) is provided with a properly sized buffer in order to avoid to lose any packets when both handover and internal switch procedures are under implementation. The application manages the data on the buffer by synchronizing the storage when the application starts.

Obviously, different kind of traffic could be present in the system: CCTV streams to the CC, video broadcasting files from the CC, data transmission, VOIP etc.). The HCA is adapted to perform a "quality of service" management by assigning priority to a certain type of traffic. (i.e. traffic relevant to passengers safety, VOIP etc). The IP addressing for the on-board system is preferably such that each MU has a different IP subnet, and therefore that the CU acts as routers from the "inside" to the "outside" of the MU.

Turning, and in greater detail, to the HCA, handover control application, it can be a Windows® CE console application that communicates with the control application on the CU to decide which CU should be the active one. It then configures the radio unit depending on whether the local CU is active or inactive.

As mentioned, in each MU, the need is to have one master CU and at least one slave CU. The master CU is the one that decides which CU should be active, while the slave CUs only report their connection status to the master and execute its instructions.

The HCA reads its configuration settings from the configuration registry keys. The main elements of such registry, and their possible settings, always to be considered as a mere example for a possible embodiment, are as follows.

"Master IP Address"—Required setting on the slave CUs. The IP address of the master CU, being it necessary that the master CU's IP address assigned to the Ethernet port be specified.

"Wlan Device Name"—In case of systems with only one WLAN interface, the default value will generally work and does not have to be specified further.

"Signal to Noise Ratio Threshold"—This parameter sets the difference in dB of the signal to noise ratio (SNR) between two CUs, difference that must be exceeded to start handover. This threshold is used to avoid constant switching between two CUs if their SNR is approximately equal.

"Handover Delay"—It sets the time in ms for which the SNR of a CU must be higher than at least the value in dB of the SNR of the currently active CU for the handover to start. Since SNR measurements can slightly vary, this avoids triggering handover due to a single bad SNR measurement.

"Command line Options"—It specifies a list of default command line options to be passed to the executable of the WLAN HCA. This is useful when automatically starting the HCA on system startup, since there is no other way to specify the command line options in this case.

Moreover. the wi-fi radio unit driven by its own WLAN driver, that is to say the specific software installed therein, designed according to the above mentioned criteria in order to attain the fast handover times compatible with the transmission of the above mentioned services, uses the following registry key for its own specific settings.

"Network Address"—It establish the manual assignment of a MAC address to be used instead of the one stored in the EEPROM of the WLAN card. This is required since both CUs in a train need to have the same MAC address. However, CUs in different trains must have different MAC addresses. The suggested strategy for choosing the MAC address is to use a locally administered MAC address (bit 1 of the first byte must be set) and derive the last bytes of the address from the IP address assigned to the train (since that needs to be unique per train as well). None of the MAC addresses stored in any EEPROM of a CU may be configured here, since the HCA uses these when the CU is inactive, which would cause collisions between inactive and active CUs.

"Inhibit Association"—By means of this key, a setting is made that prevents the automatic association with an AP during system startup. This is necessary since the CUs in a train use the same MAC address, thereby if both could automatically associate with an AP on startup, the AP would see two clients with the same MAC address. When the system starts, the HCA takes control over this setting and makes sure that only one CU associates at any given time.

"Radio Disable"—This setting is analogous to the "Inhibit Association" setting seen above, and completely disables the radio during startup until the HCA takes over. In this way, not even probe (scan) requests are sent before a unique MAC address is configured.

"Name of the AP network"—It sets the network name of the APs the CU should connect to. Obviously, this should be the same on all CUs to allow proper handover.

"Antenna Switch"—It disables automatic antenna switching/diversity. This is the recommended setting if only one antenna is connected, since it avoids using the open antenna connector completely. Depending on where the antenna is connected, this value also might have different settings for the other connector.

"Background Scan Disable"—It enables/disables background scanning. The handover concept is not based on background scanning, so disabling is recommended to avoid unwanted traffic interruption while performing a background scan.

"Net Band"—Limits the scanned channels to those used for 802.11g in order to speed up scanning. As an alternative, via a "Channel List" parameter, it is possible to manually specify the channels to be scanned, to speed up scanning even further. It is recommended to specify either "Net Band" or "Channel List", but not both at the same time.

In addition to the wi-fi radio unit specific settings above, the standard IP parameters for the radio interface need to be configured as well in a sub key (required settings: "IP Address", "Subnet Mask", "Default Gateway", "Enable DHCP").

It is important to note that DHCP must be disabled for the handover to work, so IP addresses must be assigned statically. All CUs in a MU need be configured to use the same IP address on their wi-fi radio interface in order to avoid address changes during the handover.

The HCA makes sure that only one CU uses its IP address at any given time to avoid duplicate IP addresses. The gateway IP address configured here should be the IP address of the central router located in the backbone network.

The IP addressing scheme for the handover has indeed only two simple requirements: each MU needs its own unique IP subnet for the on-train equipment and there needs be at least one additional IP subnet that contains all the wi-fi radio equipment (both APs and radio interfaces of the CUs). In this way, the CU can route the data between these two networks.

Obviously, the prefix sizes of the IP subnets must be chosen such that the on-board subnets provide enough addresses for all the on-board equipment of a single vehicle and the WLAN subnet must be able to supply one host address per vehicle, plus one host for the central router. Obviously, the on-board and WLAN subnets may and most likely will use different prefix sizes.

It is also important to note that the central WLAN router needs have one routing entry per vehicle with the associated IP address assigned to the CUs on this particular MU.

For normal operation, the HCA will normally be configured to automatically start when the system boots. Only one instance of the HCA may be running on one CU at any time and the HCA automatically protects against multiple invocations.

Turning no again to the general characteristics and performances of the system, the design of a uniform radio coverage is essential for ensuring the supply of a uninterrupted wireless communication service. The strategy used for maintaining consistent wireless performance, during the fast movement of the MU, is a based on the balanced handling of the following parameters: AP location and signal strength; antenna selection and orientation on the APs and MUs; network architecture for the MUs and mobile network units working strategy; MU and AP threshold settings; antenna configuration and diversity vs. coverage parameters; handover (roaming) algorithm and handover strategy; suitable verification and handling of the interferences to the radio signal.

Any unbalanced combination of these elements will produce a wrong behavior of the system within the wireless coverage area, including: irregular AP-MU associations, excessive retransmissions, unacceptable dropped packets and/or unpredictable system behavior jeopardizing the possibility to deliver services having as a basic requirement the "live" and "real time" attribute, such as high quality live video streaming, VOIP services and high speed real time data transmission. Above and beyond what already mentioned above, other aspects of the invention thus deserve further consideration.

Figure 17:
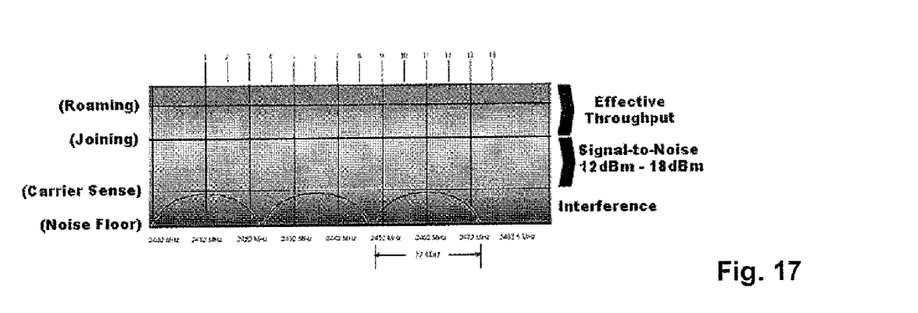
FIG. 17 is a graph showing the signal level in connection with the frequency of the wireless communication.

The 'Interference/noise floor' is the main basis for wireless signal strength requirements, as the operation of the 802.11 standard is based on efficient signal-to-noise ratios. The minimal operational signal strength threshold for a MU-AP association should be between 12 dBm and 18 dBm above the identified interference/noise floor (FIG. 17).

Figure 18:
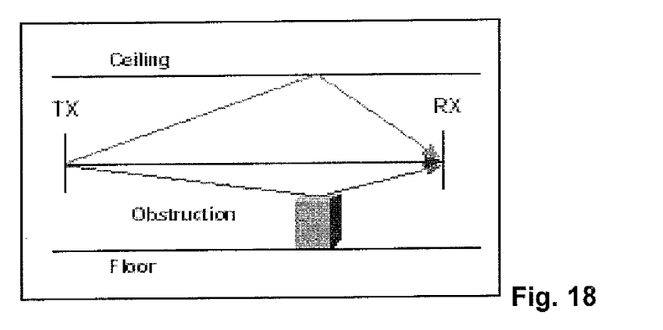
FIG. 18 is a scheme exemplifying a wireless signal distortion path between a transmissive antenna and a receiving antenna.

Multipath interference occurs when a wireless signal has more than one path between a receiver and a transmitter. This means (FIG. 18) that there can be more than one path that the RF signal takes when going from a transmissive antenna (TX) to a receiving antenna (RX). These multiple signals combine in the RX antenna and receiver to cause distortion of the signal.

The paths available for the transmitted signal to travel have different lengths and as a result, the signal propagation time is different from one path to another resulting in multiple signals arriving at the receiver at slightly different intervals. Another type of diversity to consider, as the MU is moving, is the positional diversity, occurring when the wireless radio signal quality differs from one instant to another as the MU moves to or from the signal of the associated AP.

An antenna gives the wireless system three fundamental properties: gain, direction, and polarization. Gain is a measure of increase in the power irradiated by the antenna in a prefixed direction, direction is determined by the shape of the transmission pattern, while polarization is determined by the antenna planes according to which the signal is propagated. Every type of antenna is characterized through these parameters, which will determine the different coverage capabilities. As the gain of an antenna increases, antennas offer longer coverage distances, but only in a certain direction.

Diversity antenna systems are preferably used to overcome a phenomenon known as multi-path distortion or multi-path fading. This system uses two antennas, so that the radio wi-fi device installed on the CUs of the MU receives alternatively the signal from an antenna or the other, listening until a valid radio signal is received. The system can be compared to a switch that selects one antenna or another, never both at the same time. After the beginning sync of a valid packet is heard, the radio will evaluate the sync signal of the packet on one antenna, then switch to the other antenna and evaluate. Then the radio will select the best antenna and use only that antenna for the remaining portion of that packet. On transmit, the radio will select the same antenna it used the last time it communicated to that given radio. If a packet fails, it will switch to the other antenna and retry the packet.

The adoption of such a scheme will result particularly advantageous when adapted, according to the invention, to the use on a vehicle such as a train, because the two antennas can be located at a small distance apart from each other, exploiting the external geometry pf the MU, changing and optimizing the characteristics of the antennas (strongly directive or multidirectional) as a function of the position on the vehicle, in order to attain the maximum efficiency in the transmission-reception of the radio signal between the mobile and fixed network. Typically, e.g. on a train, a strongly unidirectional antenna will be advantageously arranged in front, while a more multidirectional antenna will be arranged on the roof. The application of this scheme is independent from the shape and length of the MU thanks to the use of the system with multiple CUs on the same MU.

Finally, it is important to stress that the roaming/joining thresholds of the MU have to be set so as to maintain the appropriate signal-to-noise differential with respect to the interference/noise floor across the entire spectrum. A roaming threshold set below the appropriate SNR may cause a MU-AP association prolonged to the extent that the MU loses the signal as it passes the AP. This condition will produce intermittent beacon loss disconnects, rescans, and re-associations, resulting in excessive retransmissions, and/or dropped packets.

A joining threshold below the appropriate SNR presents the potential for MU-AP association that provides a low signal strength and poor signal-to-noise differential, decreasing the effective throughput of the AP-MU association, and causing excessive retransmissions and/or dropped packets. As far as the APs are concerned, these must provide for full area coverage with a consistent minimum signal level above the measured noise floor Thanks to the present invention, a system is provided with a broadband transmission channel and a wide range of supported services while keeping unaffected the "live" characteristics of the same, completely using the maximum bandwidth while the vehicle moves at the maximum speed.

The bandwidth of the radio communication made available by the system permits to support high quality live video streaming, simultaneously from different video cameras, real time high speed data transmission, real time video transmission and voice transmission between fast moving vehicles and one or more ground centers.

The bandwidth can be effectively managed so as to be shared simultaneously among the transmitted services, assuring and maintaining the real time requirement of the transmission between the fixed and the mobile networks.

As far as the distribution of the APs is concerned, it is not necessary that the APs provide for a uniform radio coverage along the route in order to attain the above mentioned performances. In fact, according to the invention the flexibility of the algorithms and the characteristics of the architectures of the system permit to reach the required transmissive performances even with a discontinuity of the signal coverage or in areas in which the signal is below the minimum established signal/noise threshold. The overlap of the radio coverage of the installed AP is no longer necessary as in the prior art. The APs can then be arranged at greater distance (which tolerates a lacking in overlap for a distance up to the length of the MU), and their number be reduced (with remarkable savings).

Variants and/or modifications can be brought to the broadband telecommunication system between one or more control centers and one or more mobile units moving at high speed without departing from the scope of the same as defined by the appended claims.

The invention claimed is:

1. A telecommunication system comprising at least one control center and at least one mobile unit moving along a track, said at least one control center connected in a network with a plurals of wireless access points distributed along the track, said at least one mobile unit and said at least one control center conducting a broad band bi-directional communication of data/signal with roaming between said mobile unit and the plurality of wireless access points, each of said at least one mobile unit comprising onboard receiving-transmitting means for connection with said wireless access points, the each of said at least one mobile unit running a control application for continuously controlling the communication between the at least one mobile unit and a presently detected one of the access points, wherein the instructions cause the each the at least one mobile unit to perform the following method steps:

setting a bandwidth decision threshold under which the bandwidth obtainable with the channel in transmission triggers a roaming, said bandwidth obtainable being based on the consideration of a measurement of a received signal/noise ratio;

setting a signal decision threshold under which the signal level received triggers a roaming;

setting a time between two subsequent comparisons of the signal level received and the bandwidth in transmission with said respective signal decision threshold and bandwidth decision threshold, during which the presently detected one of the access points is deemed valid;

evaluating the signal level and bandwidth of the channel in transmission and the time during which the presently detected one of the access points is deemed valid, and triggering a roaming step when said signal level is under the signal decision threshold, said bandwidth is under said bandwidth decision threshold, or when said set time for deeming valid the presently detected one of the access points is lapsed;

the roaming step comprising scanning a predetermined and programmable list of channels a determined time lapsing between the scan of a channel and the scan of a subsequent one, said channels including only frequencies preliminarily detected in order to attain the maximum bandwidth available, the selected channels being stored for speeding up a successive scan; updating a list of the valid access points based on the scanning step; and reassociating the communication from said present access point to a new access point in said list, when the signal level of the new access point exceeds the signal level of the present access point by a value corresponding to an established hysteresis threshold determined as a function of the mobile unit speed.

2. The system according to claim 1, wherein said on board receiving-transmitting means comprise a plurality of control units, each of the plurality of the control units being connected to respective one of said access points, and selection means for continuously scanning the quality of said broad band communication on each of said plurality of control units in accordance with control application, and for deciding by comparison which of said control units is enabled for communication, disabling others of the plurality of control units that remain in a condition of continuous communication scan.

3. The system according to claim 2, wherein said selection means comprise a switch operating on a LAN interconnecting said plurality of control units.

4. The system according to claim 2, wherein each said at least one mobile unit comprises two control units of said plurality of control units arranged at respective ends of said at least one mobile unit each of said two control units having separate antenna means.

5. The system according to claim 4, wherein each said separate antenna means is a diversity antenna system comprising two antennas, whereby the signal is selectively received by one of the two antennas, the control unit remaining idle until a valid radio signal is received.

6. The system according to claim 5, wherein said two antennas are arranged close to each other and comprise an antenna arranged in a front position of the mobile unit and an antenna on the rooftop of the mobile unit, the transmissive characteristics of high directionality, or multidirectionality are established of the design parameters, and mainly the propagation characteristics, of the specific use.

7. The system according to claim 2, wherein said control application assigns to all the control units of said mobile unit the same MAC address, whereby the standard procedures for ensuring the connection and the correct association of the exchanged data during detection of a MAC variation are avoided.

8. The system according to claim 2, wherein the one of the plurality of control units is a network master unit working as a preferred destination of the user data, whereby a master-slave architecture is obtained, the decision of which of the control units is the network master unit being made via a configuration parameter that is static but adjustable.

9. The system according to claim 2, wherein said control application automatically directs data/signal towards the working control units, and in case of a malfunctioning of one or more of the plurality of control units, maintains the transmission of the data flow in a reduced manner.

10. The system according to claim 2, wherein said plurality of control units comprises a buffer memory sized so as to avoid the loss of data packages during the roaming step.

11. The system according to claim 1, wherein in said network said access points are alternatively connected to neighboring stations, so that a failure in a station does not prevent that a regular service be ensured by the adjacent station, the network further comprising active and stand-by control centers physically separated by said access points and by the hubs of the stations.

12. The system according claim 1, wherein all the access points are linked with the control center in a star architecture, without any access point of the network having also functions of aggregation, interface or network link to other access points.

13. The system according to claim 1, wherein, given the adoption of a frequency planning that divides the assigned spectrum in a number of partially overlapping channels, three non-overlapping channels are used in order to take advantage of the maximum band width available.

* * * * *